United States Patent
Gulick

[11] Patent Number: 6,085,270
[45] Date of Patent: *Jul. 4, 2000

[54] MULTI-CHANNEL, MULTI-RATE ISOCHRONOUS DATA BUS

[75] Inventor: Dale E. Gulick, Austin, Tex.

[73] Assignee: Advanced Micro Devices, Inc., Sunnyvale, Calif.

[*] Notice: This patent is subject to a terminal disclaimer.

[21] Appl. No.: 09/098,655

[22] Filed: Jun. 17, 1998

[51] Int. Cl.$^7$ ............................. G06F 13/00; H04L 12/50
[52] U.S. Cl. ........................... 710/100; 370/376; 370/442
[58] Field of Search ............................ 710/100, 126–130; 370/442–477, 375–379

[56] References Cited

U.S. PATENT DOCUMENTS

| | | | |
|---|---|---|---|
| 3,796,835 | 3/1974 | Closs et al. | 370/355 |
| 4,068,098 | 1/1978 | Thyselius | 370/379 |
| 4,071,701 | 1/1978 | Leijonhufvud et al. | 370/379 |
| 4,446,555 | 5/1984 | Devault et al. | 370/352 |
| 4,471,480 | 9/1984 | Haussmann et al. | 370/242 |
| 4,635,280 | 1/1987 | Smith et al. | 375/376 |
| 4,672,604 | 6/1987 | Bhatia et al. | 370/376 |
| 4,731,783 | 3/1988 | Fontanes | 370/321 |
| 5,136,578 | 8/1992 | Beshai et al. | 370/375 |
| 5,146,455 | 9/1992 | Goke et al. | 370/376 |
| 5,276,712 | 1/1994 | Pearson | 375/360 |
| 5,319,680 | 6/1994 | Port et al. | 375/375 |
| 5,533,205 | 7/1996 | Blackledge, Jr. et al. | 710/117 |
| 5,544,324 | 8/1996 | Edem et al. | 709/231 |
| 5,592,480 | 1/1997 | Carney et al. | 370/347 |
| 5,615,223 | 3/1997 | Carr | 714/818 |
| 5,761,450 | 6/1998 | Shah | 710/107 |
| 5,784,369 | 7/1998 | Romiti et al. | 370/358 |
| 5,841,777 | 11/1998 | Cohen | 370/443 |
| 5,862,160 | 1/1999 | Irvin et al. | 714/807 |
| 5,867,496 | 2/1999 | Peres et al. | 370/376 |
| 5,940,600 | 8/1999 | Staats et al. | 710/107 |
| 5,944,801 | 8/1999 | Gulick | 710/29 |

*Primary Examiner*—Ayaz R. Sheikh
*Assistant Examiner*—Sumati Lekrowitz
*Attorney, Agent, or Firm*—Conley, Rose & Tayon, PC; B. Noel Kivlin

[57] ABSTRACT

An isochronous bus may includes a data signal, a data valid signal, a frame synch signal and a clock signal. The bandwidth of the data signal is partitioned into a plurality of frames. The frame rate may be selected based upon the sample rate of one of the isochronous devices connected to the isochronous bus or maybe some divisor of the data rate of the isochronous bus. Each frame is partitioned into a plurality of data channels. Each data channel transmits data from an isochronous device. A number of bit time slots are allocated to each data channel. The number of bit time slots allocated to each data channel varies based upon the sample rate of the device corresponding to the data channel. In one embodiment, each data channel is allocated more bit time slots than the nominal samples of its corresponding device. In this manner, any drift of the sample clock may be accommodated. A data valid signal is transmitted synchronous to the data signal and the clock signal. The data valid signal indicates which bit time slots include valid data. As discussed above, a data channel may be allocated more bit time slots than the expected number of samples during a frame. The drift of the sample clock of a device relative to the isochronous bus clock may be detected by monitoring the period of the data valid signal. The system may handle multiple isochronous data streams with different, non-related sample rates.

21 Claims, 7 Drawing Sheets

MULTI-CHANNEL, MULTI-RATE ISOCHRONOUS DATA BUS

BACKGROUND OF THE INVENTION

1. Field of the Invention

The present invention relates to computer systems and, more particularly, to a data bus for isochronous data within computer systems.

2. Description of the Related Art

Computer systems, such as personal computer systems, were originally developed for business applications such as word processing, databases and spread sheets, among others. Computer systems, however, are currently being used to handle a number of isochronous tasks including: multimedia applications having video and audio components, video capture and playback, telephony applications, and speech recognition and synthesis, among others. Generally speaking, isochronous tasks are time-dependent tasks. In other words, the data handled by an isochronous task must be delivered or processed within certain time constraints.

One problem that has arisen is that computer systems originally designed for business applications are not well suited to the time-dependent requirements of modern multimedia applications. For example, modern computer system architectures still presume that the majority of applications executed are business applications, such as word processing or spread sheet applications. Typical computer systems are inefficient at handling streams of time-dependent data, or isochronous data, that make up multimedia data types. The isochronous data of multimedia tasks require the maintenance of a temporal component. For example, audio signals are coded as a stream of samples taken at a consistent sampling rate. The temporal relationship between these samples must be maintained to prevent perceptible errors such as gaps or altered frequencies. Likewise, the loss of the temporal relationship in a video signal can cause blank screens or lines.

The bus structures in typical computer systems are not designed to handle isochronous data. Bus contention, delays and overhead prevent buses, such as the Peripheral Component Interconnect (PCI) bus, from reliably transferring data at precise intervals as required for isochronous data.

Several data bus protocols have been developed to facilitate the transfer of isochronous data within computer systems. These standards include the I²S bus defined by Philips and the Audio Codec '97 (AC '97) bus defined by Intel. To reduce cost, these buses are serial buses rather than parallel buses. Unfortunately, these serial buses do not efficiently support multiple data streams with different sample rates. This is especially true when there is no clear relationship between the sample rates of the various data streams (e.g., where the sample rates of the data streams are not multiples or divisors of each other). One method of combining data streams having different sampling rates is to convert the data to a common sample rate. This conversion may be performed by using interpolation and/or decimation. Unfortunately, data conversion is a time consuming and hardware intensive task. Further, to convert the data back to the original sample rate, requires information identifying the original sample rate to be transmitted with the data.

A further shortcoming of conventional buses for transmitting isochronous data is the inability to detect and compensate for clock drift between sample clocks within the computer system. Techniques for compensating for clock drift include phase-lock loop techniques and interpolation. Unfortunately, these techniques are hardware intensive and/or time consuming.

What is desired is an isochronous bus that efficiently handles multiple isochronous data streams with different, non-related sample rates. It is further desirable to detect and correct clock drift between multiple clocks within the computer system.

SUMMARY OF THE INVENTION

The problems outlined above are in large part solved by an isochronous data bus in accordance with the present invention. The isochronous bus may include four signals: a data signal, a data valid signal, a frame synch signal and a clock signal. The bandwidth of the data signal is partitioned into a plurality of frames. The frame rate may be selected based upon the sample rate of one of the isochronous devices connected to the isochronous bus or maybe some divisor of the data rate of the isochronous bus. Each frame is partitioned into a plurality of data channels. Each data channel transmits data from an isochronous device. A number of bit time slots are allocated to each data channel. The number of bit time slots allocated to each data channel varies based upon the sample rate of the device corresponding to the data channel. For example, assume a computer system has a first device with twice the sample rate of a second device. A first data channel corresponding to the first device will have twice as many bit time slots allocated per frame as a second data channel corresponding to the second device. In one embodiment, each data channel is allocated more bit time slots than the nominal samples of its corresponding device. In this manner, any drift of the sample clock may be accommodated.

A data valid signal is transmitted synchronous to the data signal and the clock signal. The data valid signal indicates which bit time slots include valid data. As discussed above, a data channel may be allocated more bit time slots than the expected number of samples during a frame. The data valid signal is asserted during each bit time slot that represents valid data. The data valid signal is unasserted during bit time slots which are not utilized during that frame.

The drift of the sample clock of a device relative to the isochronous bus clock may be detected by monitoring the period of the data valid signal. If the period of the data valid signal increases over time, the sample rate of the device leads the isochronous bus clock. Alternatively, if the period of the data valid signal decreases over time, the sample rate of the device lags the isochronous bus clock. In one embodiment, the period of the data valid signal for a data channel is integrated to determine the lead or lag of the sample clock of a device relative to the isochronous bus clock. In one particular embodiment, the lead or lag information is provided to the device, which adjusts its sample rate to synchronize its sample clock with the isochronous bus clock.

Broadly speaking, the present invention contemplates a method of transferring time-dependent data of a plurality of devices wherein the data of the plurality of devices have independent sample rates, comprising: partitioning a bus bandwidth into a plurality of frames; partitioning a first of the plurality of frames into a plurality of data channels corresponding to the plurality of devices; allocating a number of bit time slots to a first of the plurality of data channels, wherein the number of bit time slots is at least equal to a number of data samples of a device corresponding to the first data channel during a period of the first frame.

The present invention further contemplates an apparatus for transmitting or receiving isochronous data from a plurality of isochronous devices with independent samples rates including an isochronous data port, a plurality of isochronous devices coupled to the isochronous data port; and an isochronous bus coupled to the isochronous data port. The isochronous data port is configured to acquire data from the plurality of isochronous devices and to output frames of time-dependent data on the isochronous data bus. The first frame is partitioned into a plurality of data channels corresponding to the plurality of isochronous devices. The first of the plurality of data channels corresponding to a first of the plurality of isochronous devices is partitioned into a plurality of bit time slots, wherein a number of bit time slots allocated to the first data channel is at least equal to a number of samples from the first isochronous device during a period of the first frame.

The present invention further contemplates a computer system including a processor; a memory coupled to the processor; an isochronous data port coupled to the memory; a plurality of isochronous devices coupled to the isochronous data port; and an isochronous bus coupled between the isochronous data port and the memory. The isochronous data port is configured to acquire data from the plurality of isochronous devices and to output frames of time-dependent data on the isochronous data bus. The first frame is partitioned into a plurality of data channels corresponding to the plurality of isochronous devices. The first of the plurality of data channels corresponding to a first of the plurality of isochronous devices is partitioned into a plurality of bit time slots, wherein a number of bit time slots allocated to the first data channel is at least equal to a number of samples from the first isochronous device during a period of the first frame.

BRIEF DESCRIPTION OF THE DRAWINGS

Other objects and advantages of the invention will become apparent upon reading the following detailed description and upon reference the accompanying drawings in which.

Figure 1:
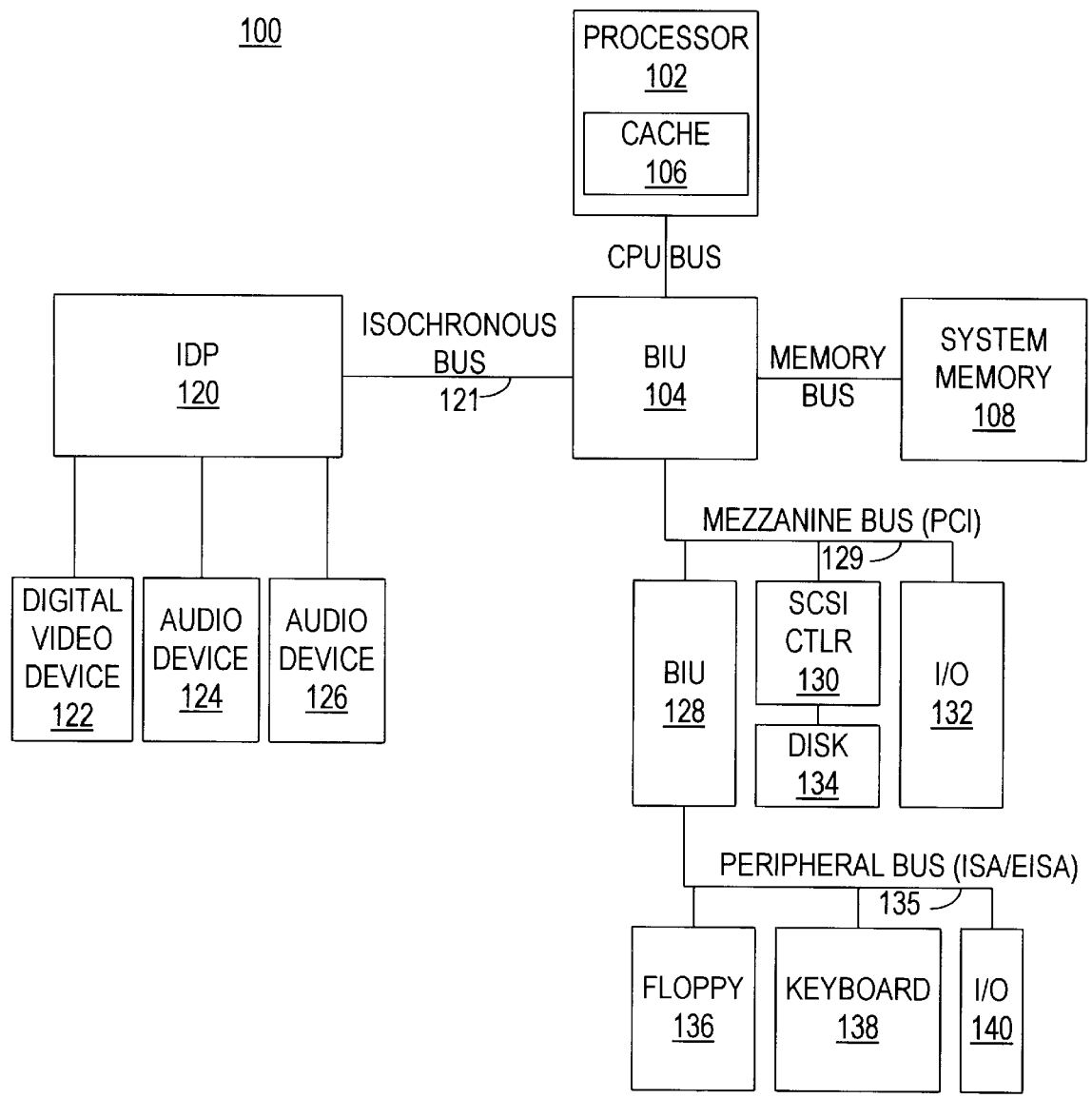
FIG. 1 is a block diagram of a computer system including an isochronous data bus according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Turning now to FIG. 1, a block diagram illustrating a computer system 100 having multiple buses, including a central processing unit (CPU) bus, a memory bus, a mezzanine bus, a peripheral bus, and an isochronous data bus is shown. The CPU bus connects a CPU 102, or processor, to a bus interface unit 104. A cache memory 106 is preferably embodied within processor 102 and/or linked to processor 102 by the CPU bus. Bus interface unit 104 provides an interface between components clocked at similar rates. Bus interface unit 104 preferably contains a memory controller which allows communication to and from system memory 108. In one embodiment, system memory 108 comprises DRAM or SDRAM. Bus interface unit 104 is coupled to mezzanine bus 129. In one embodiment, mezzanine bus 129 is a Peripheral Component Interconnect (PCI) bus. In other embodiments, mezzanine bus 129 may implement other conventional bus protocols. In the illustrated embodiment, a plurality of input/output (I/O) devices are coupled to mezzanine bus 129. In the illustrated embodiment, the I/O devices include a SCSI controller 130, which is coupled to a disk device 134.

Mezzanine bus 129 is additionally coupled to a bus interface unit 128. Bus interface unit 128 provides an interface between mezzanine bus 129 and peripheral bus 135. In one embodiment, peripheral bus 135 is an Extended Industry Standard Architecture (EISA) bus. In other embodiments, peripheral bus 135 may implement other conventional bus protocols. In the illustrated embodiment, peripheral bus 135 is coupled to a floppy disk drive 136, a keyboard 138, and an input/output device 140.

Isochronous data port (IDP) 120 is coupled to a plurality of isochronous devices. In the illustrated embodiment, IDP 120 is coupled to a digital video device 122, an audio device 124 and an audio device 126. IDP 120 is configured to send and/or receive data to or from the isochronous devices. In one embodiment, IDP 120 combines data from independent sources with independent sample frequencies into one data stream. IDP 120 is configured such that the sample rates of the individual data are maintained. In one embodiment, the lead or lag of the clocks of the isochronous devices relative to an IDP clock may be derived from the data. In one particular embodiment, the lead/lag information is provided to the isochronous devices to synchronize the devices with the IDP clock.

In the illustrated embodiment, an isochronous bus 121 of IDP 120 is coupled to an isochronous data input of bus interface unit 104. In this embodiment, IDP 120 may exchange data with system memory 108 via bus interface unit 104. In an alternative embodiment, the isochronous bus of LDP 120 may be coupled to bus interface unit 128. In this embodiment, another isochronous bus may connect bus interface unit 128 to bus interface unit 104. IDP 120 may exchange data with system memory 108 via the pair of isochronous buses, bus interface 128 and bus interface 104. Alternatively, bus interface unit 128 may include digital signal processing circuitry that processes the isochronous data directly.

Figure 2:
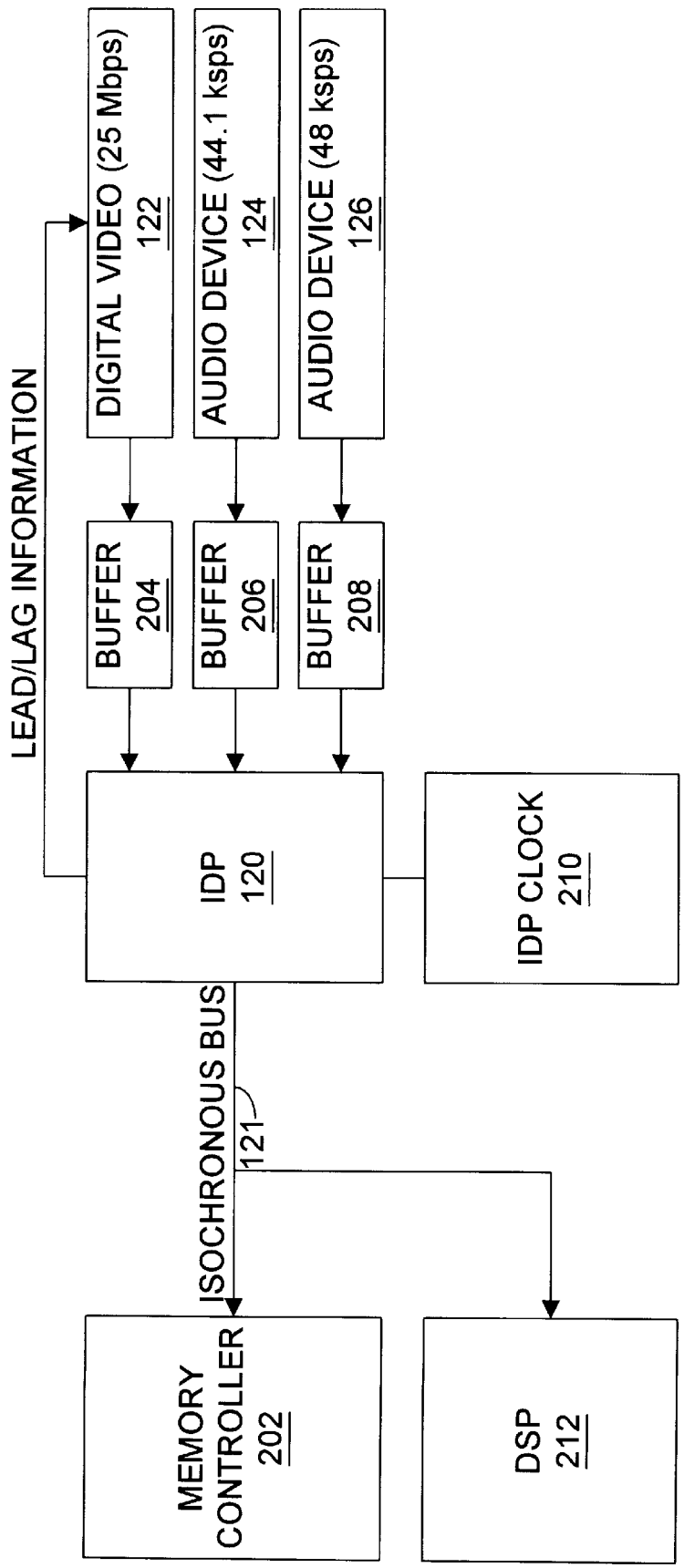
FIG. 2 is a block diagram of a memory controller, a digital signal processor, an isochronous data port and a plurality of isochronous devices according to one embodiment of the present invention.

Turning now to FIG. 2, a block diagram illustrating the interconnection of a memory controller 202, a digital signal processor 212, IDP 120 and a plurality of isochronous devices is shown. In the illustrated embodiment, IDP 120 is coupled to three isochronous devices. A digital video device 122 sources 25 megabytes of data per second to IDP 120. An audio device 124 is a stereo audio device that sources 44,100 16-bit samples per second per channel. An audio device 126 is a stereo audio device that sources 48,000 20-bit samples per second per channel. Buffers 204–208 provide temporary storage for the data from the isochronous devices. IDP 120 periodically reads the data from buffers 204–208. IDP 120 combines the data from the isochronous devices into a single stream of data which is transmitted to memory controller 202 or digital signal processor 212. In the illustrated embodiment, the isochronous devices source data to IDP 120. It is noted that in other embodiments, the isochronous devices may receive data from IDP 120, or the isochronous devices may source and receive data from IDP 120.

IDP clock 210 provides a timing signal to IDP 120. In one embodiment, IDP clock 210 is derived from a master system clock.

IDP 120 is configured to combine data from multiple isochronous devices with different sample rates into one continuous stream of data. The sample rates of the isochronous devices may be non-related, i.e., the sample rates may not be multiples or divisors of each other. Further, IDP 120 can detect clock drift between IDP clock 210 and the clock of the isochronous devices. In one embodiment, IDP 120 is configured to extract lead/lag information from the data stream received from an isochronous device. In one particular embodiment, IDP 120 passes the lead/lag information back to the isochronous devices, which may use the lead/lag information to synchronize their respective clocks to IDP clock 210.

Figure 3:
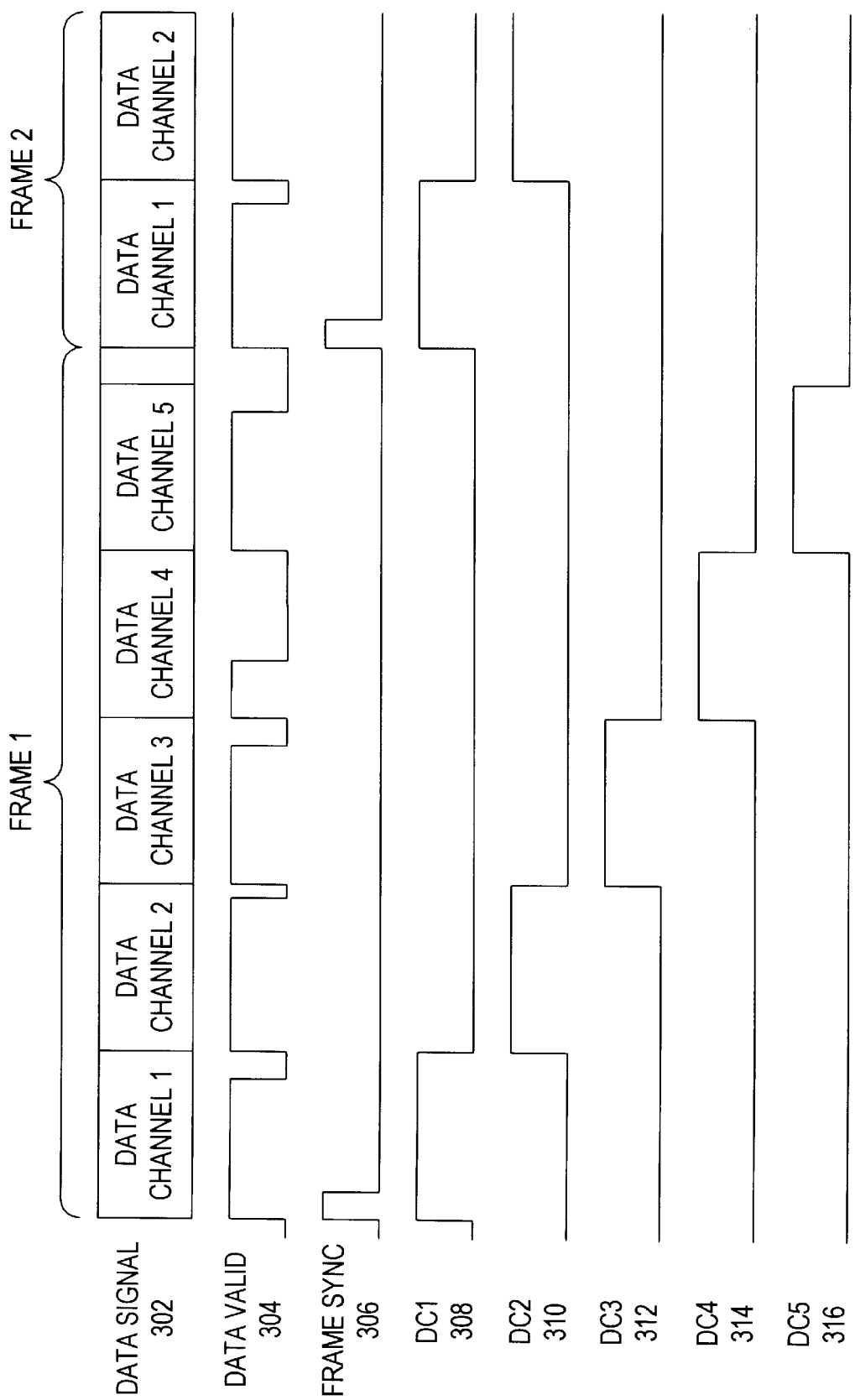
FIG. 3 is a timing diagram illustrating the partitioning of an isochronous bus bandwidth and associated control signals according to one embodiment of the present invention.

Turning now to FIG. 3, a timing diagram illustrating the partitioning of a bus bandwidth and associated control signals is shown according to one embodiment of the present invention. The isochronous bus output by IDP 120 includes a data signal 302, a data valid signal 304 and a frame synch signal 306. In one embodiment, the signals of the isochronous bus are synchronized to an IDP clock signal (not shown).

The bandwidth of data signal 302 is partitioned into a plurality of frames. Generally speaking, a frame is a fixed number of bit time slots. The number of bit time slots per second is determined by the rate of the clock signal to which data signal 302 is synchronized. The number of bit time slots in a frame may be determined by the sample rate of an isochronous devices serviced by IDP 120. For example, digital video device 122 may transmit 488 bytes of data 6400 times per second. The frame rate may be designed around this device and accordingly 6400 frames per second generated. If the clock rate is 33 MHz, then there are approximately 5,156 bit time slots per frame. Alternatively, the frame rate may be chosen as some practical divisor of the IDP clock rate or it may have an arbitrary relationship to the data rate of the devices and the clock rate.

The frames of data signal 302 is further partitioned into a plurality of data channels. Generally speaking, each data channel transmits a single data stream. It is noted that data channels may not be of equal lengths. Generally speaking, a data stream is data from an isochronous device. Some devices may output a plurality of data streams. For example, each channel of stereo audio device 124 may be defined as an individual data stream. In the illustrated embodiment, the isochronous devices output five data streams (the digital video signal and each channel of the two stereo audio devices.) Accordingly each frame is partitioned into five data channels. Data channel 1 is assigned to digital video device 122. Data channel 2 is assigned to one channel of stereo audio device 124. Data channel 3 is assigned to the other channel of stereo audio device 124. Data channel 4 is assigned to one channel of stereo audio device 126 and data channel 5 is assigned to the other channel of stereo audio device 126.

Each data channel is further partitioned into a number of bit time slots. Generally speaking, a bit time slot is a single bit position within a data channel. The number of bit time slots allocated to each data channel is based upon the sample rate of the data stream corresponding to that data channel. The number of bit time slots allocated to a data channel is related to the nominal sample rate of the device corresponding to the data channel. For example, a data channel corresponding to a first isochronous device with a sample rate twice the sample rate of a second isochronous device may be allocated twice as many bit time slots as the data channel corresponding to the second isochronous device. In one embodiment, each data channel is assigned more than the nominal number of bit time slots expected for an isochronous device during a frame to accommodate drift between IDP clock 210 and the clocks of the isochronous devices. For example, digital video device 122 nominally outputs 488 bytes of data (or 3904 bits of data) each frame. If the clock of digital video device 122 is synchronized with IDP clock 210, IDP 120 receives 3904 bits per frame. However, due to the drift between the clocks, IDP 120 may receive more or less bits per frame than the nominal rate of 3904 bits. Accordingly, the data channel that corresponds to digital video device 122 may be allocated more bit time slots than 3904.

Data valid signal 304 identifies which bits within a data channel are valid and which bits are not valid. In one embodiment, data valid signal 304 and data signal 302 are synchronized to the IDP clock signal. As discussed above, each data channel may be allocated more bits than required to transmit the data from an isochronous device during the frame. The data valid signal identifies which bit time slots contain valid data. In the illustrated embodiment, data valid 304 is asserted during bit time slots that contain valid data, and unasserted during bit time slots that are not used during that frame. For example, assume that data channel 1 is allocated 3912 bit time slots. In a frame in which the nominal number of bits (3904 bits) are transmitted, data valid signal 304 is asserted for the first 3904 bits and unasserted for the remaining eight bits.

Frame synch 306 is a signal that indicates the start of each frame. The DC1 signal 308 indicates the duration of data channel 1. Likewise, the DC2 signal 310 through the DC5 signal 316 indicate the duration of data channels 2 through 5, respectively.

An example of the partitioning of the bandwidth of data signal 302 into data channels and bit time slots is discussed below in reference to isochronous devices 122–126 of FIG. 2. As discussed above, a frame rate of 6,400 frames per second may be chosen based on the sample rate of digital video device 122. At this frame rate, the nominal samples per frame for each channel of audio device 124 is 6.9 samples. The nominal number of samples for each channel of audio device 126 is 7.5. As discussed above, the nominal bits per frame of digital video device 122 is 3904 bits.

As discussed above, additional bit time slots may be allocated to each data channel to accommodate clock drift. Assume for example that the IDP clock and the clocks of the isochronous devices are accurate to ±100 parts per million (ppm). The aggregate bit rate of the data from isochronous devices 122, 124, and 126 is approximately 28.3 Mbps (1.4 Mbps +1.92 Mbps +25 Mbps). The maximum clock error occurs when IDP clock 210 is off by 100 ppm and the individual clocks of the isochronous devices are off in the opposite direction by 100 ppm. This condition equals an error of 6,183 cycles per second (3,300 cycles per second +2,831 cycles per second) or less than one cycle per frame.

In one embodiment, the number of samples per data channel is rounded up to account for the drift of the clocks. In other words, the number of samples per channel of audio device 124 is rounded up from 6.9 samples to 7 samples and the number of samples per channel of audio device 126 is increased from 7.5 samples to 8 samples. To accommodate for the clock drift of digital video device 122, the number of bit time slots is increased by one byte (or eight bits). Accordingly, the final bit allocation for each data channel of a frame may be as follows: Data channel 1 is allocated 3,912 bit time slots, data channel 2 is allocated 112 bit time slots (7 samples at 16-bits per sample), data channel 3 is allocated 112 bit time slots, data channel 4 is allocated 160 bit time slots (8 samples at 20-bits per sample), and data channel 5 is allocated 160 bit time slots. This equals 4,456 data bits per frame (or 28,518,400 bits per second). At 6,400 frames per second and a clock rate of 33 MHz there are approximately 5,156 bit time slots per frame. Subtracting the number of bit time slots per frame from the number allocated to data channels 1 through 5 leaves approximately 600 unused bits per frame. These unused bits are placed at the end of the frame.

Figure 4:
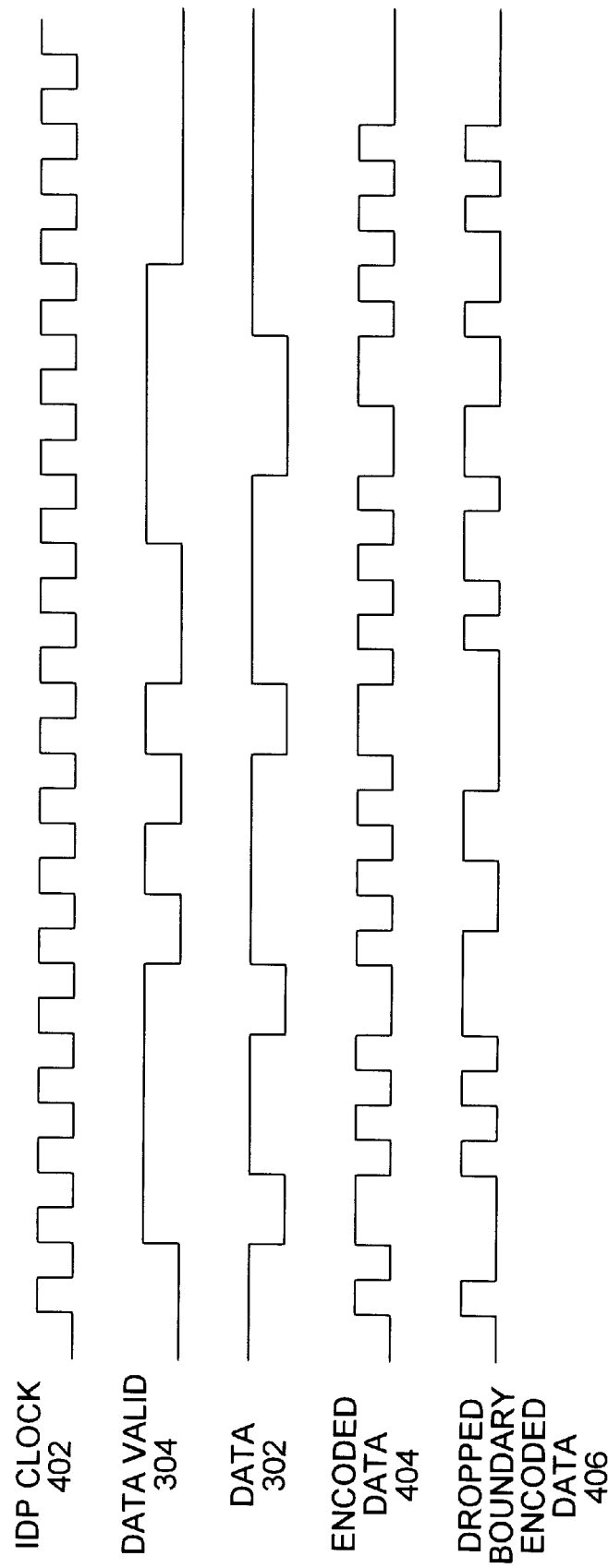
FIG. 4 is a timing diagram illustrating the encoding of control signals associated with an isochronous bus according to one embodiment of the present invention.

Turning now to FIG. 4, a timing diagram illustrating the encoding of data and control signals according to one embodiment of the present invention is shown. In one embodiment, IDP 120 conveys an IDP clock signal 402, a data valid signal 304, a data signal 302 and a frame synch signal 306 (not shown) to a receiver. In another embodiment, the number of signals required to be transferred to the receiver is reduced by encoding the signals. In the illustrated embodiment, IDP clock signal 402, data valid signal 304 and data signal 302 are combined into one signal that is transmitted to the receiver as discussed below.

Encoded data signal 404 is generated from data signal 302 and IDP clock signal 402. Encoded data signal 404 transitions on each rising edge of clock signal 402 and transitions on the falling edge of clock signal 402 only when data signal 302 is asserted. It is noted that signal transitions of data signal 302 occur on the rising edge of clock signal 402.

Dropped boundary encoded data signal 406 is generated by removing transitions of encoded data signal 404 on the rising edge of clock signal 402 when data valid signal 304 changes state on that rising edge. Dropped boundary encoded data signal 406 and frame synch signal 306 are transmitted to the receiver, which recovers IDP clock signal 402, data signal 302 and data valid signal 304 from these signals as discussed below.

The receiver that receives frame synch signal 306 and dropped boundary encoded data signal 406 recovers IDP clock signal 402 from dropped boundary encoded data signal 406 using a conventional clock recovery scheme. In one embodiment, the receiver recovers IDP clock signal 402 using a phase-lock loop. The polarity of IDP clock signal 402 is determined by the frame synch signal. A rising edge of IDP clock signal 402 is substantially synchronized with the rising edge of frame synch signal 306.

The receiver recovers data valid signal 304 from dropped boundary encoded data signal 406 by detecting transitions of the data valid signal. As discussed above, dropped boundary encoded data signal 406 does not change state on the rising edge of clock signal 402 when data valid signal 304 changes state on that edge. By detecting the absence of a transition of dropped boundary encoded data signal 406 on the rising edge of the clock, the transitions of data valid signal 304 may be determined. Because the data valid signal is invalid during the bit time slot prior to the rising edge of the frame synch signal 304, the first detected transition of data valid signal 304 subsequent to the rising edge of frame synch signal is a transition from the unasserted state to the asserted state. Based on this information, data valid signal 304 can be reconstructed.

Data signal 302 is recovered from dropped boundary encoded data signal 406. If a transition of dropped boundary encoded data signal 406 is detected on the falling edge of clock signal 402, data signal 302 is asserted during that clock cycle. Alternatively, if no transition of dropped boundary encoded data signal 406 is detected on the falling edge of clock signal 402, then data signal 302 is unasserted during that clock cycle.

In one embodiment, data signal 302 is forced to the asserted state when data valid signal 304 is unasserted. When data valid signal 304 is unasserted, the data on data signal 302 is ignored. By forcing the data on data signal 302 to the asserted state, transitions of dropped boundary encoded data signal 406 are ensured on the falling edge of clock signal 402 even if the transition is dropped on the rising edge of clock signal 402. These transitions aid in recovery of the clock signal.

Figure 5:
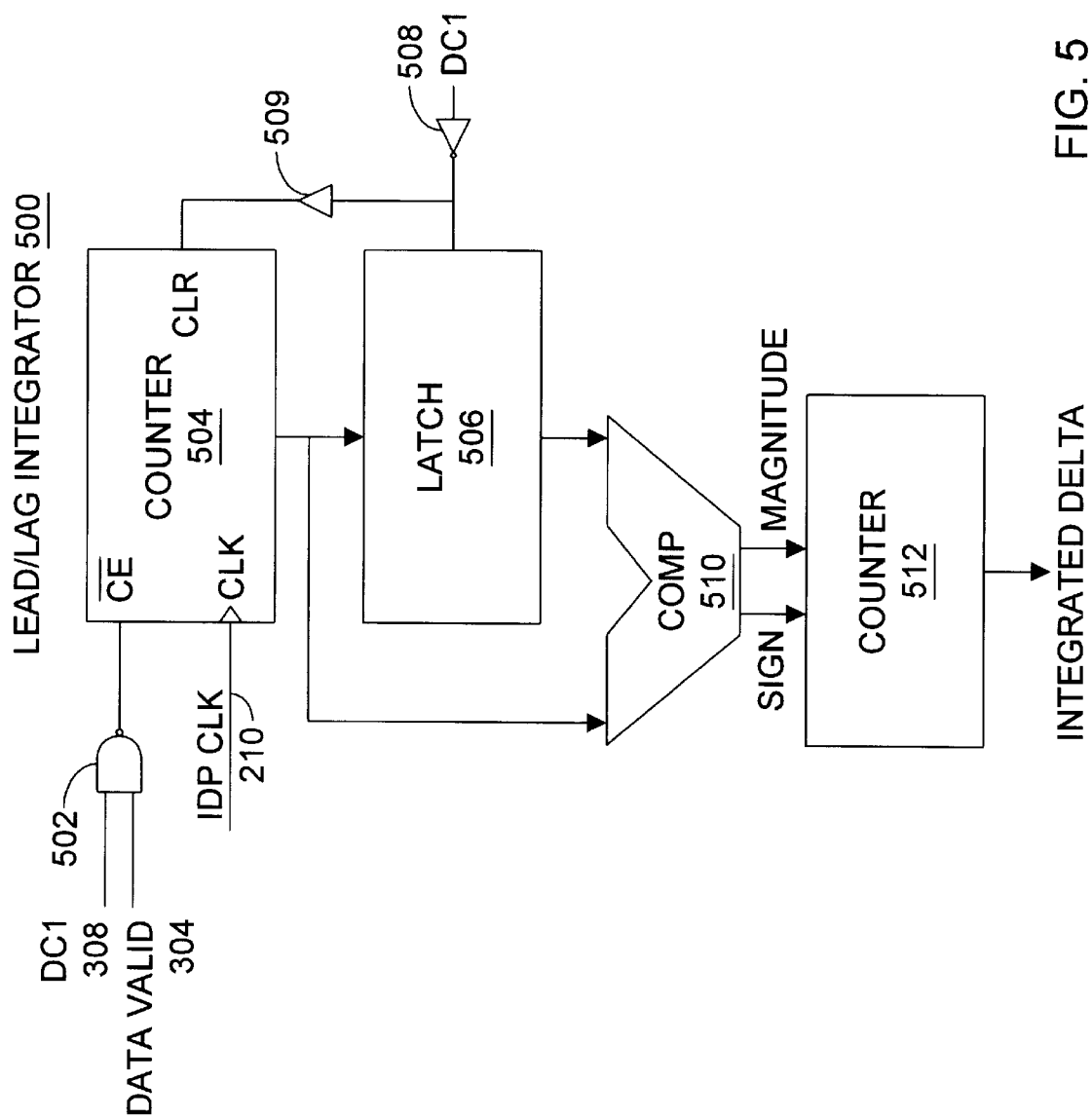
FIG. 5 is a block diagram of a lead/lag integrator according to one embodiment of the present invention.

Turning now to FIG. 5, a block diagram of a lead/lag integrator according to one embodiment of the present invention is shown. As discussed above, in one embodiment IDP 120 detects drift between IDP clock 210 and the clocks that control the isochronous devices. If a clock of an isochronous device is running faster than IDP clock 210, then that clock is leading IDP clock 210. Alternatively, if a clock of an isochronous device is running slower than IDP clock 210, the clock is lagging IDP clock 210. The clocks of the isochronous devices may be synchronized by detecting the lead or lag of the clocks relative to IDP clock 210 and adjusting the rate of the clocks accordingly.

In one embodiment, the lead or lag of the clock of an isochronous device is determined by measuring the period of the data valid signal. If a clock leads IDP clock 210, then the data channel associated with the clock will have more sample data and the data valid signal will be asserted for a longer duration. Accordingly, monitoring the period of the data valid signal during a data channel is indicative of the lead or lag of the clock of the isochronous device associated with that data channel.

FIG. 5 illustrates a lead/lag integrator 500 for detecting the lead or lag of a clock of an isochronous device relative to IDP clock 210. Lead/lag integrator 500 is an example of a lead/lag indicator that detects the phase difference between two clocks. In one embodiment, one lead/lag integrator 500 is used per data channel. Lead/lag integrator 500 detects the lead/lag of the clock of the isochronous device associated with data channel 1 relative to IDP clock 210. Lead/lag indicator 500 includes an NAND-gate 502, a counter 504, a latch 506, an inverter 508, a buffer 509, a comparator 510 and a counter 512. The period of data valid signal 304 during a particular data channel is detected by counting the number of cycles of IDP clock 210 during the period of data valid signal 304. Counter 504 is enabled when data valid signal 304 and DC1 308 are asserted. At the beginning of the data channel, the previous count is stored by latch 506 and the counter is cleared. Buffer 509 delays the clearing of the counter until the count is latched. Comparator 510 compares the current counter output to the stored counter output to determine the delta of the period of data valid signal 304. Comparator 510 outputs a sign signal and a magnitude signal to counter 512 which accumulates the period of delta of data valid signal 304. This accumulated delta signal may be provided to the clock of the isochronous device corresponding to data channel 1 to compensate for clock drift.

Figure 6:
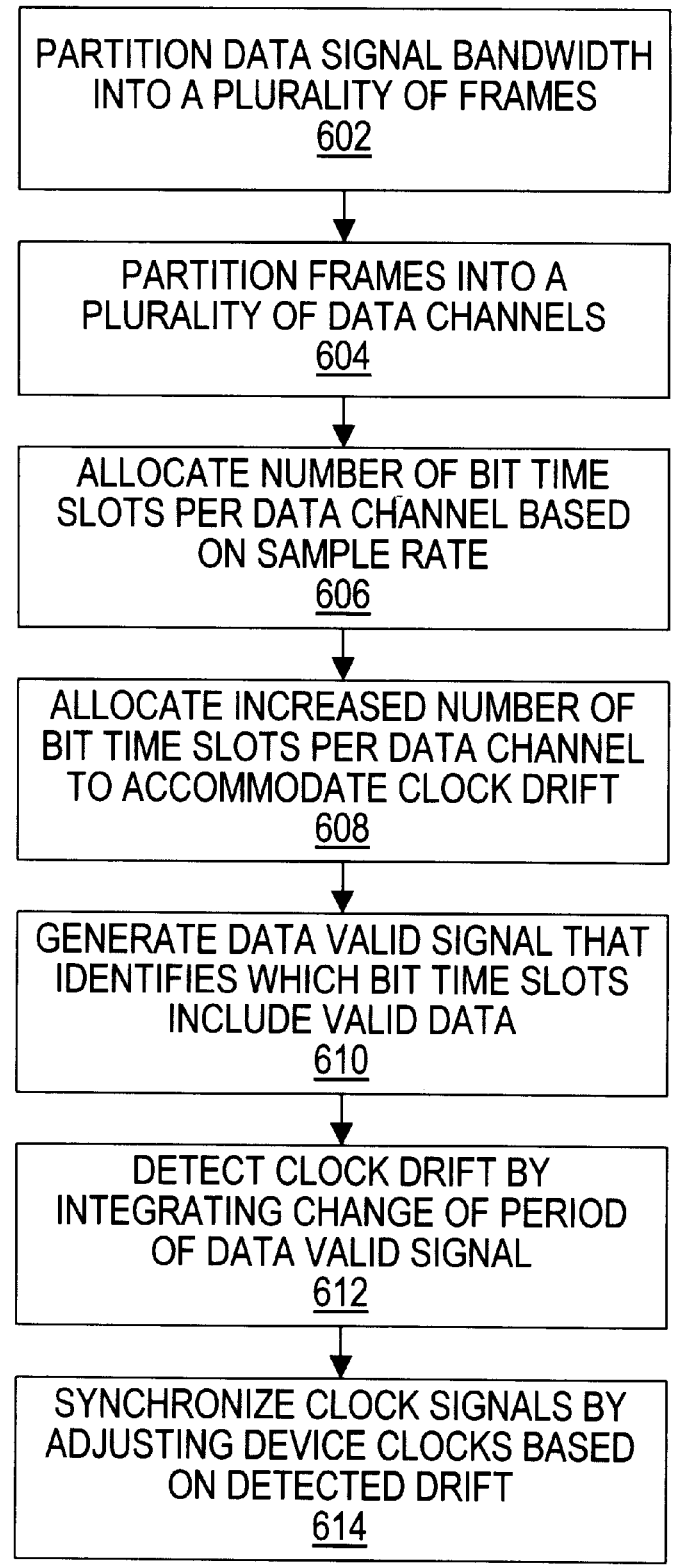
FIG. 6 is a flowchart diagram illustrating the transfer of time-dependent from a plurality of isochronous devices with independent sample rates according to one embodiment of the present invention.

Turning now to FIG. 6, a flowchart diagram illustrating the method of transferring time-dependent data from a plurality of isochronous devices with independent sample rates according to one embodiment of the present invention is shown. In step 602, the bandwidth of a data bus signal is partitioned into a plurality of frames. Generally speaking, a frame is a fixed number of bit time slots. The frame rate may be chosen based on the sample rate of one or more devices, may be a divisor of the clock rate of the data bus, or maybe unrelated to the sample rate of the devices or the clock rate of the data bus. In step 604, the frames are partitioned into a plurality of data channels. Each data channel is associated with an isochronous device that sources or receives data contained in the data signal. A device may have a plurality of data channels associated with it. For example, a stereo audio device may have a data channel allocated to each of the two channels of the stereo device.

In step 606, a number of bit time slots are allocated to each data channel. Generally speaking, a bit time slot is a bit position for transferring data. In one embodiment, one data bit is transferred each cycle of an isochronous data port (IDP) clock. The number of bit time slots allocated to a data channel is based upon the sample rate of the device associated with the data channel. Devices with higher sample rates are allocated more bit time slots per data channel than devices with lower sample rates.

In step 606, the number of bit time slots per channel is increased to accommodate clock drift. If the clocks associated with the devices that source data are not synchronized with the IDP clock, then more or less data may be generated per frame. Accordingly, more bit time slots are allocated to each data channel to accommodate drift between the clocks. In step 610, a data valid signal is generated that identifies which bit time slots include valid data.

In step 612, drift between the IDP clock and the clocks of the isochronous devices are detected by integrating the change of the period of the data valid signal. As discussed above, the data valid signal identifies which bit time slots include valid data. Accordingly, the period of the data valid signal identifies the quantity of data received from a device. By integrating the change of the data valid period over time, the drift between the clock of an isochronous device and the IDP clock may be detected. In step 614, the clocks of the isochronous devices are synchronized to the IDP clock by conveying the clock drift information to those devices. An isochronous device may use the clock drift information to adjust its clock rate to synchronize its clock to the IDP clock.

Figure 7:
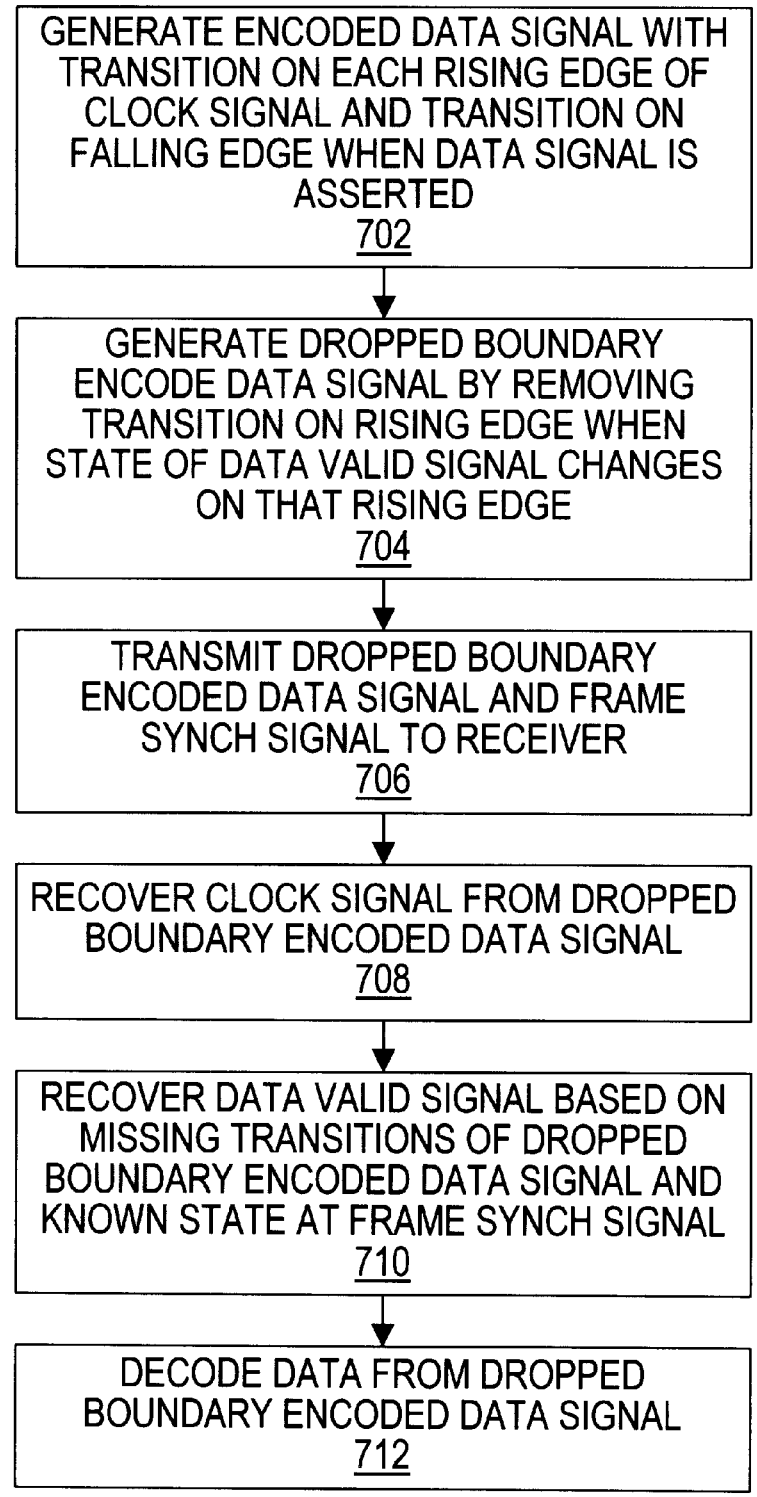
FIG. 7 is a flowchart diagram illustrating the encoding of data signals associated with an isochronous bus according to one embodiment of the present invention.

Turning now to FIG. 7, a flowchart diagram illustrating the encoding of data signals associated with an isochronous bus according to one embodiment of the present invention is shown. In step 702, an encoded data signal is generated. In one embodiment, the encoded data signal includes a transition at each rising edge of an IDP clock signal. The encoded data signal additionally includes a transition on the falling edge of the IDP clock when the data signal is asserted. In step 704, a dropped boundary encoded data signal is generated by removing, transitions of the encoded data signal on the rising edge of the IDP clock when the state of the data valid signal changes on that rising edge. In other words, if the data valid signal transitions on the rising edge of the IDP clock signal, the transition of the encoded data signal on that rising edge is removed.

In step 706, the dropped boundary encoded data signal and a frame synch signal are transmitted to a receiver. In step 708, the receiver recovers the IDP clock signal from the dropped boundary encoded data signal. In one embodiment, the IDP clock signal is recovered using a phase-lock loop. In one particular embodiment, the phase of the IDP clock signal is based on the frame synch signal. A rising edge of the IDP clock signal occurs substantially simultaneously with the frame synch signal. In step 710, the receiver recovers the data valid signal by detecting the removed boundaries of the dropped boundary encoded data signal. Each rising edge of the IDP clock that does not coincide with a transition of the dropped boundary encoded data signal identifies a transition of the data valid signal. Further, the data valid signal is unasserted during the bit time slot prior to the frame synch signal. Accordingly, the first data valid transition during or after the rising edge frame synch signal indicates a rising edge of the data valid signal.

In step 712, the data signal is recovered from the dropped boundary encoded data signal. If the dropped boundary encoded data signal transitions on the falling edge of the IDP clock the data bit during that clock cycle is asserted. Alternatively, if the dropped boundary encoded data signal does not transition on the falling edge of the IDP clock signal, the data signal during that clock cycle is unasserted.

Numerous variations and modifications will become apparent to those skilled in the art once the above disclosure is fully appreciated. It is intended that the following claims be interpreted to embrace all such variations and modifications.

What is claimed is:

1. A method of transferring time-dependent data of a plurality of devices wherein said data of said plurality of devices have independent sample rates, comprising:

partitioning a bus bandwidth into a plurality of frames;

partitioning a first of said plurality of frames into a plurality of data channels,
  wherein each of said plurality of data channels corresponds to one of said plurality of devices;

allocating bit time slots to each of said plurality of data channels,
  wherein a number of bit time slots allocated to said each data channel exceeds a number of samples of said corresponding device during a period of said first frame.

2. The method of claim 1 wherein independent sample rates of said plurality of devices are accommodated by allocating differing numbers of bit time slots to said data channels corresponding to said devices.

3. The method of claim 2 further comprising outputting a data valid signal configured to identify which bit time slots represent valid samples.

4. The method of claim 3 further comprising transmitting said time-dependent data partitioned into said frames and said data valid signal to a receiver.

5. The method of claim 4 further comprising transmitting a clock signal to said receiver, wherein said time-dependent data and said data valid signal are synchronized to said clock signal.

6. An apparatus for transmitting or receiving isochronous data from a plurality of isochronous devices with independent samples rates, comprising:

an isochronous data port;

a plurality of isochronous devices coupled to said isochronous data port; and an isochronous bus coupled to said isochronous data port;

wherein said isochronous data port is configured to acquire data from said plurality of isochronous devices and to output frames of time-dependent data on said isochronous data bus;

wherein a first frame is partitioned into a plurality of data channels, wherein each of said plurality of data channels corresponds to one of said plurality of isochronous devices; and wherein each of said plurality of data channels is partitioned into a plurality of bit time slots, wherein a number of bit time slots allocated to said each data channel exceeds a number of samples of said corresponding isochronous device during a period of said first frame.

7. The apparatus of claim 6 further comprising a plurality of buffers coupled between said isochronous data port and said plurality of isochronous devices, wherein a first buffer coupled to a first device is configured to store isochronous data and said isochronous data port is configured to read said data from said buffer.

8. The apparatus of claim 6 wherein independent sample rates of said plurality of isochronous devices are accommodated by allocating differing numbers of bit time slots to said data channels corresponding to said isochronous devices.

9. The apparatus of claim 8 wherein said isochronous data port is configured to output a data valid signal that identifies which of said plurality of bit time slots represent valid samples.

10. The apparatus of claim 9 wherein said isochronous data port is configured to output a clock signal, wherein said isochronous data and said data valid signal are synchronized to said clock signal.

11. The apparatus of claim 10 wherein said isochronous data bus is coupled to a memory, which is configured to store said isochronous data.

12. A computer system comprising:

a processor;

a memory coupled to said processor;

an isochronous data port coupled to said memory;

a plurality of isochronous devices coupled to said isochronous data port; and an isochronous bus coupled between said isochronous data port and said memory;

wherein said isochronous data port is configured to acquire data from said plurality of isochronous devices and to output frames of time-dependent data on said isochronous data bus;

wherein a first frame is partitioned into a plurality of data channels, wherein each of said plurality of data channels corresponds to one of said plurality of isochronous devices; and wherein each of said plurality of data channels is partitioned into a plurality of bit time slots, wherein a number of bit time slots allocated to said each date channel exceeds a number of samples of said corresponding isochronous device during a period of said first frame.

13. The computer system of claim 12 further comprising a plurality of buffers coupled between said isochronous data port and said plurality of isochronous devices, wherein a first buffer coupled to a first device is configured to store isochronous data and said isochronous data port is configured to read said data from said buffer.

14. The computer system of claim 12 wherein independent sample rates of said plurality of isochronous devices are accommodated by allocating differing numbers of bit time slots to said data channels corresponding to said isochronous devices.

15. The computer system of claim 14 wherein said isochronous data port is configured to output a data valid signal that identifies which of said plurality of bit time slots represent valid samples.

16. The computer system of claim 15 wherein said isochronous data port is configured to output a clock signal, wherein said isochronous data and said data valid signal are synchronized to said clock signal.

17. The computer system of claim 16 wherein said isochronous data bus is coupled to said memory, which is configured to store said isochronous data.

18. A method of transferring time-dependent data of a plurality of devices wherein said plurality of devices have independent sample rates, wherein said independent sample rates are synchronized to sample clocks, comprising:

partitioning a bus bandwidth into a plurality of frames;

partitioning each of said plurality of frames into a plurality of data channels,
wherein each of said plurality of data channels corresponds to one of said plurality of devices;

allocating a number of bit time slots to each of said plurality of data channels,
wherein said number of bit time slots allocated to said each data channel is the sum of a number of samples of said corresponding device during a period of said each frame and a number of time slots necessary to accommodate drift of the sample clocks.

19. The method of claim 1 further comprising determining the sample rates of said plurality of devices.

20. The method of claim 19 wherein said number of bit time slots allocated to said each data channel varies from data channel to data channel depending on the sample rate of said corresponding device.

21. The method of claim 1 wherein a frame rate remains constant; wherein a number of data channels is variable; and wherein said number of bit time slots allocated to said each data channel is variable.

* * * * *